United States Patent
Sauder et al.

(10) Patent No.: US 12,426,530 B2
(45) Date of Patent: Sep. 30, 2025

(54) SYSTEMS, METHODS, AND APPARATUS FOR PLACEMENT OF STARTER FERTILIZER

(71) Applicant: 360 YIELD CENTER, LLC, Morton, IL (US)

(72) Inventors: Talon Sauder, Green Valley, IL (US); Justin Koch, Morton, IL (US); Timothy Sauder, Tremont, IL (US); Stephen Ramp, Peoria, IL (US); Andrew Dornbier, Garner, IA (US); Jesse D. Kaiser, Tremont, IL (US); Gregg A. Sauder, Tremont, IL (US)

(73) Assignee: 360 YIELD CENTER, LLC, Morton, IL (US)

( * ) Notice: Subject to any disclaimer, the term of this patent is extended or adjusted under 35 U.S.C. 154(b) by 637 days.

(21) Appl. No.: 17/865,332

(22) PCT Filed: Jan. 20, 2021

(86) PCT No.: PCT/US2021/014131
§ 371 (c)(1),
(2) Date: Jul. 14, 2022

(87) PCT Pub. No.: WO2021/150572
PCT Pub. Date: Jul. 29, 2021

(65) Prior Publication Data
US 2023/0189696 A1    Jun. 22, 2023

Related U.S. Application Data

(60) Provisional application No. 62/963,254, filed on Jan. 20, 2020.

(51) Int. Cl.
*A01C 7/06* (2006.01)
*A01B 49/06* (2006.01)
(Continued)

(52) U.S. Cl.
CPC ............... *A01C 7/06* (2013.01); *A01B 49/06* (2013.01); *A01C 5/062* (2013.01); *A01C 7/203* (2013.01)

(58) Field of Classification Search
CPC .. A01C 7/06; A01C 7/00; A01C 5/062; A01C 5/06; A01C 5/00; A01C 7/203;
(Continued)

(56) References Cited

U.S. PATENT DOCUMENTS 4,294,181 A    10/1981 Smith
5,425,318 A     6/1995 Keeton
(Continued)

FOREIGN PATENT DOCUMENTS

CN          109168464 A      1/2019

OTHER PUBLICATIONS

International Search Report and Written Opinion for PCT/US2021/014131 mailed dated Apr. 2, 2021, 16 pages.
(Continued)

*Primary Examiner* — Christopher J. Novosad
(74) *Attorney, Agent, or Firm* — Klintworth & Rozenblat LLP (57) ABSTRACT

Systems, methods, and an apparatus for distributing starter fertilizer during the planting process. In an embodiment, a starter fertilizer system is configured to apply fertilizer to a planted seed during a planting process. The starter fertilizer system includes a rudder blade, a fertilizer reservoir and a conduit. The rudder blade is configured to the dig a furrow that is offset from the planted seed. The conduit is coupled with the fertilizer reservoir and the rudder blade such that fertilizer is able to traverse from the reservoir to the rudder blade. The rudder blade is offset from each row unit such that fertilizer is expelled at a desired fertilizer location.

27 Claims, 11 Drawing Sheets

(51) Int. Cl.
*A01C 5/06* (2006.01)
*A01C 7/20* (2006.01)

(58) Field of Classification Search
CPC ........... A01C 7/201; A01C 7/20; A01B 49/06; A01B 49/04; A01B 49/00
See application file for complete search history.

(56) References Cited

U.S. PATENT DOCUMENTS

| | | |
|---|---|---|
| 2006/0162632 A1 | 7/2006 | Bourgault et al. |
| 2012/0234218 A1 | 9/2012 | Martin |
| 2012/0266794 A1 | 10/2012 | Schaffert |
| 2017/0049044 A1 | 2/2017 | Stoller et al. |
| 2018/0110180 A1 | 4/2018 | Sheppard et al. |

OTHER PUBLICATIONS

Canadian Office Action issued in connection with Canadian application No. 3168634 Dated Sep. 27, 2024, 5 pages.

SYSTEMS, METHODS, AND APPARATUS FOR PLACEMENT OF STARTER FERTILIZER

RELATED APPLICATIONS

The disclosure claims the priority benefit of U.S. provisional patent application Ser. No. 62/963,254 filed on Jan. 20, 2020, and international patent application number PCT/US21/14131 filed on Jan. 20, 2021 which is hereby incorporated by reference herein in its entirety.

BACKGROUND

The present embodiments relate to systems, methods and an apparatus for placement of fertilizer at or near an agricultural seed (which may be referred to herein as a "seed") during a planting process. This fertilizer, which may be liquid or dry, may be referred to as starter fertilizer because it is distributed during the planting process and is intended to fertilize the early or beginning roots growing out of the seed. Proper application of starter fertilizer may increase crop yields. However, the location or position of starter fertilizer, relative to the planted seed, may impact the yield of the crop. Fertilizer placed on (e.g., touching) or too close to the seed, may burn the seed and cause harm to the growth. Fertilizer placed too far away from the seed may lose the effectiveness and minimize the benefits of starter fertilizer.

DESCRIPTION

The present embodiments relate to systems, methods, and an apparatus for placement of starter fertilizer.

A system is provided that delivers fertilizer to a desired fertilizer location during the planting process. The desired fertilizer location, relative to a planted seed, is approximately three-fourths inch horizontally adjacent to the planted seed and one-fourth inch below the planted seed. In order to deliver the starter fertilizer to the desired fertilizer location, which is believed to be the optimal location away from the planted seed for maximizing crop yield, an apparatus includes a rudder blade that is angled and also a spacer that positions the fertilizer center line three-fourths of an inch to the side of the seed such that when the rudder blade moves through the soil, the rudder blade creates a furrow that is three-fourths of an inch to the side of the seed and one-quarter inch below the center line of the planted seed.

Consistent spacing between the starter fertilizer and a seed is important. Stated differently, it is optimal to have the same or nearly the same (e.g., as little deviation as possible) spacing between seed and fertilizer from one seed to the next. However, at times during the planting process, objects (e.g., rocks or debris) or soil types or hardness, may cause a starter fertilizer attachment to deflect away from the optimal fertilizer center line. In some embodiments, a system is provided that is able to adjust back to the optimal fertilizer center line after an object (e.g., a rock) or soil type deflects or obstructs the path of a starter attachment rudder blade. The starter attachment rudder blade is able to return to the fertilizer center line relative to the seed and continue distributing fertilizer to the desired fertilizer location.

Planter System That Includes a Starter Fertilizer System

Figure 1:
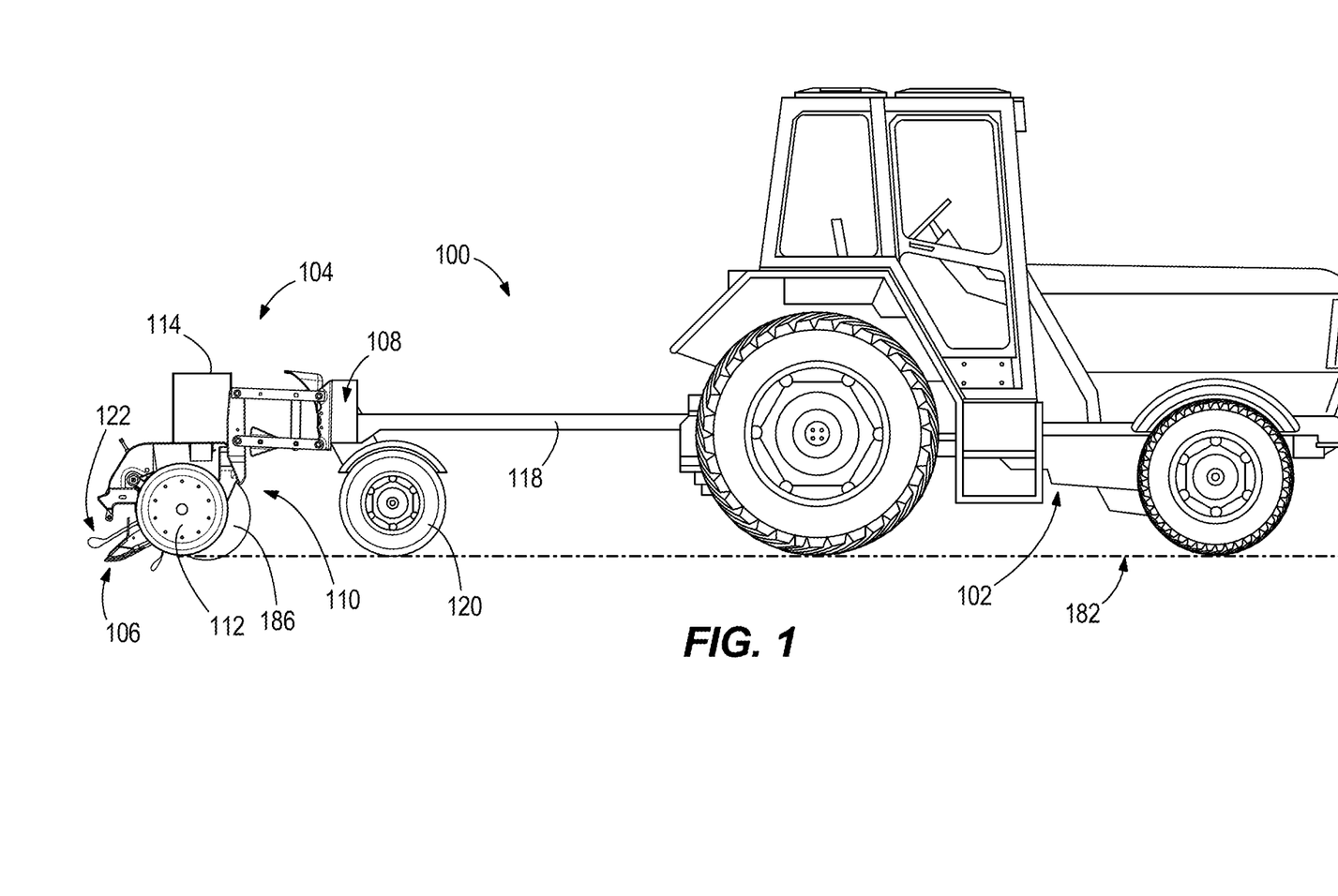
FIG. 1 illustrates a side view of one embodiment of a planter system that includes a tractor, planter, and starter fertilizer attachment.

Referring to the drawings, wherein like reference numerals designate identical, corresponding, or similar parts throughout the several views, FIG. 1 illustrates a side elevation view of a planter system 100. The planter system 100 may be used during the planting process to both plant and fertilize seed in a field. During the planting process, the planter opens a furrow in the agricultural field (hereinafter "field") using an opening disc and a seed is placed in the furrow. The planter system 100 is configured to cover the seed with soil and then distribute fertilizer at an optimal location relative to the planted seed using the starter fertilizer system.

As shown in FIG. 1, the planter system 100 may include a tractor 102, a planter 104, and a starter fertilizer system 106. The planter system 100 may include additional, different, or fewer components.

The components of the planter system 100 may be connected together in a manner that allows them to operate together and perform a planting process. The tractor 102 may be coupled with the planter 104. The planter 104 may be coupled with the starter fertilizer system 106. It is recognized that, as used herein, "coupled with" may include directly or indirectly connected with one or more intermediary components. "Coupled with" may also include a mechanical connection, electrical connection, or both. As a result of the coupling between the tractor 102 and planter 104, the tractor 102 is able to pull or tow the planter 104 and starter fertilizer system 106 through a field.

The tractor 102 is an agricultural or farm vehicle that is configured to provide high tractive effort (or torque) at slow speeds. The tractor 102 may include a power supply (e.g., a gasoline or diesel engine) that supplies power to the tractor 102. In addition to moving the tractor 102, the power supply may also supply power to other accessories, implements, or functions that are coupled with the tractor 102. For example, the tractor 102 may supply power to the planter 104 and the starter system 106. In one embodiment, the power supply delivers power to a pump of the starter system fertilizer system 106, which is described in more detail below.

The planter 104 is an agricultural implement that is drawn by the tractor 102 during the planting process. During the planting process, the planter 104 is configured to make a furrow in the soil and place a seed into the soil at the proper depth and spacing. A furrow may be an opening, trench, ditch, hole, or other area that receives the seed from the planter 104. After the seed is placed in the furrow, the planter 104 covers the seed with soil as described more below.

As shown in FIG. 1, the planter 104 includes a toolbar 108 and one or more row units 110. The planter 104 may include additional, different, or fewer components.

The toolbar 108 is configured to connect the one or more row units 110 to the tractor 102. The toolbar 108 may be configured to hold the row units 110. The row units 110 may be fastened to the toolbar 108. In some embodiments, the row units 110 are bolted to the toolbar 108. In some embodiments, the toolbar 108 may be a square or a rectangular tube that is attached to the tractor 102. The length and size of the toolbar 108 may depend on the number and size of the row units. In some embodiments, the toolbar 106 may be as wide as the planter 104. The row units 110 may be attached to the toolbar 108 using a fastening method, for example a clamp plate and bolts. Each row unit 110 may be attached to the toolbar 108 at various spacing or width. For example, the row spacing may be thirty inches between row units.

Instead of connecting the toolbar 108 to the tractor 102, the toolbar 108 may be connected to an implement 118 to allow the one or more row units 108 to be attached to the toolbar 108. The implement 118 may have wheels 120 and hydraulic cylinders to raise and lower the implement, which in turn also raises and lowers the row units. The number of seed units 110 may be equal to each row for the planter 104. By way of example, a 24 row planter may have 24 row units 110.

The toolbar 108 may be fastened directly to the tractor 102 using multiple bolts or screws. The toolbar 108 may be fastened to the tractor using a two or three point mechanism. A two point mechanism is an apparatus to directly connect a tractor to an implement that may use to sliding and locking device to secure the implement to the tractor. The three point hitch uses three connection points with a ball and pin joint to connect the tractor to the implement. As more row units are added, the weight may be too heavy to directly connect the toolbar 108 to the tractor 102. The weight of the toolbar 108 and one or more row units 110 may exceed the weight limitation of direct connection to the tractor 102. The weight limitation may depend on the size of the tractor 102 and toolbar 108. As such, in an alternative embodiment, an implement 118 may be used to carry the toolbar 108 and row units 110. The toolbar 108 may be connected to the implement 118 by bolting, welding or other means. The implement 118 may have wheels 120 that will be raised or lowered by hydraulic cylinders. The raising and lowering of the implement 118 may raise and lower the toolbar 108. The row units 110 may be connected to the toolbar 108 and may be raised or lowered with the implement 118 and toolbar 108.

The one or more row units 110 may include a seed storage container 114, a seed furrow disk 112, and one or more gauge wheels 186. A row unit 110 may include additional, different, or fewer components. For example, a row unit may connect to a controller that is able to control the depth of the furrow.

Each row unit 110 includes a row unit frame supporting one or more seed storage container (e.g., bins or hoppers) for holding seeds, insecticide or other crop inputs. Each row unit 110 includes a seed furrow disc 112 for opening a furrow in the soil as the planter is pulled through the field by a tractor 102. The depth of the trench is set by gauge wheels 186 which ride on the surface of the soil 182.

The individual row units 110 may include additional components such as, seed counters, a vacuum or compressed air separators for the seed, and seed firmer 122 that control the seed until it is firmed and covered in the soil. For example, the individual row unit 110 sorts the seed and individually plants the seed into the soil at a correct depth and at the defined spacing. The defined depth may be established by the row units 110 that will control the depth of the seed furrow. The row unit 110 may have a seed firmer 122 to push the seed flat with the bottom of seed furrow.

Turning now to the starter fertilizer system 106 shown in FIG. 1. The starter fertilizer system 106 may be configured, as described below, to deliver fertilizer (which may be referred to as a "shot" or "shot of fertilizer") in the soil at a specific location that has a precise distance horizontally from the seed and precise distance vertically from the seed level. This specific location is the desired fertilizer location. The desired fertilizer location may be a location, relative to the seed that is not too close to the seed, which may burn the seed, but is also not too far away from the seed such that the fertilizer loses effectiveness. For example, if fertilizer is too far away, the early roots growing out of the seed will not absorb fertilizer as the roots will not reach the desired fertilizer location during the initial plant growth. As such, the desired fertilizer location may be considered to be an optimal location for the seed. In a preferred embodiment, as described in more detail below, the desired fertilizer location is horizontally three-fourths (¾) inch from the planted seed (e.g., on any side) and one-fourth (¼) inch deeper than the planted seed. The amount of fertilizer (e.g., by volume) delivered to this location may vary depending, for example, on the type of soil, type of seed being fertilized, typical weather patterns, soil temperature and so on.

Figure 1A:
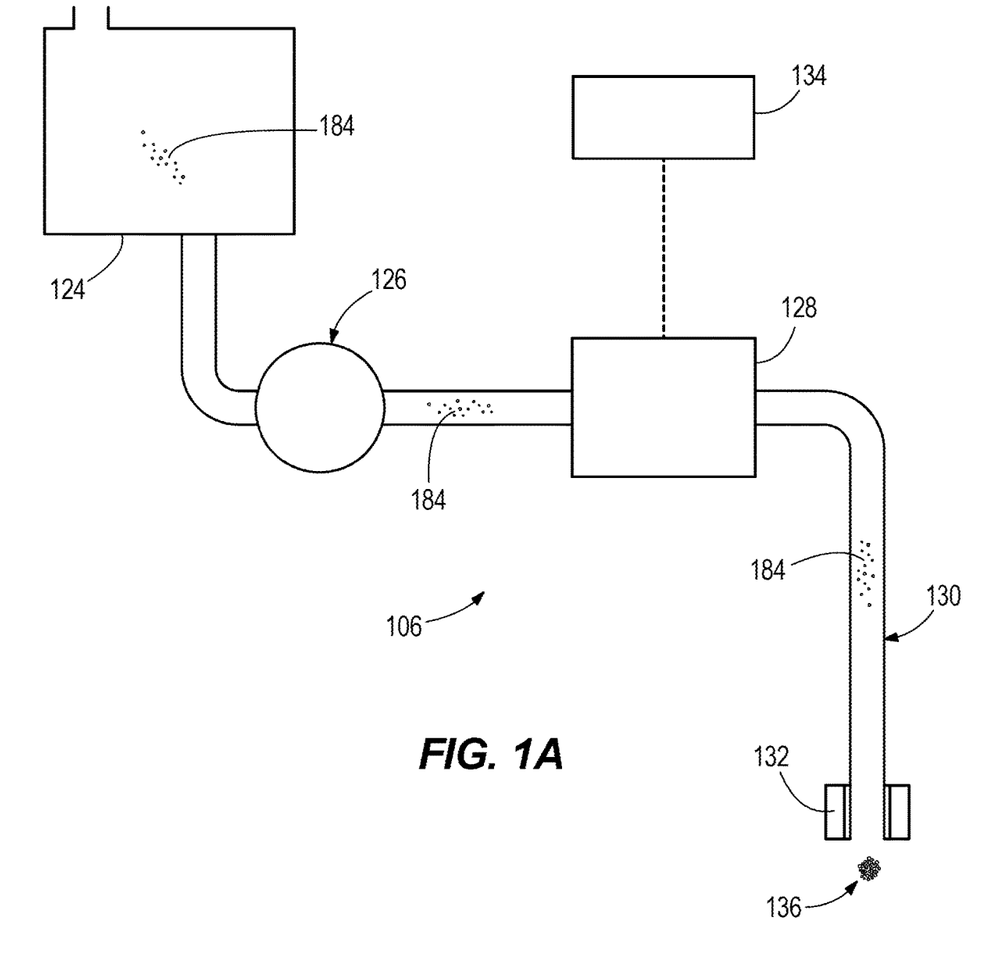
FIG. 1a illustrates a schematic drawing of one embodiment of a starter fertilizer distribution system.

FIG. 1A is a schematic of the starter fertilizer system 106 that delivers a shot 136 of fertilizer 184. The starter fertilizer system 106 may include a reservoir 124, pump 126, valve pulsator 128, controller 134, conduit 130, orifice 132, fertilizer 184 and a rudder blade (not shown). The starter fertilizer system 106 may include additional, different, or fewer components.

The pump 126 may be powered by the tractor 102 engine. The conduit 130 may connect the reservoir 124, which carries the fertilizer 184, to the pump 126. The conduit 130 may be a hose, pipe, or tube. The conduit 130 may be made of plastic, rubber or tubing. The pump 126 may be connected to the reservoir 124 by conduit 130, such that the pump 126 receives the fertilizer 184 from the reservoir 124 and create a pressure in the conduit 130 to the valve pulsator 128. The controller 134 sends a signal to the valve pulsator 128 so the shot 136 may be expelled through the orifice 132 and deposited in the desired fertilizer location. The valve pulsator 128 will pass a shot of pressurized liquid fertilizer into the conduit 130. The orifice 132 may be placed at the end of the conduit 130. The valve pulsator 128 may pulse a shot to be horizontal matched to the seed position in the seed furrow. The pulse from the valve pulsator 128 will force the shot through the orifice 132 into the soil at a time that coordinates with the location of the seed. Stated differently, the valve pulsator 128 will time the fertilizer shot 136 such that the fertilizer may be placed in the desired fertilizer location.

Figure 2:
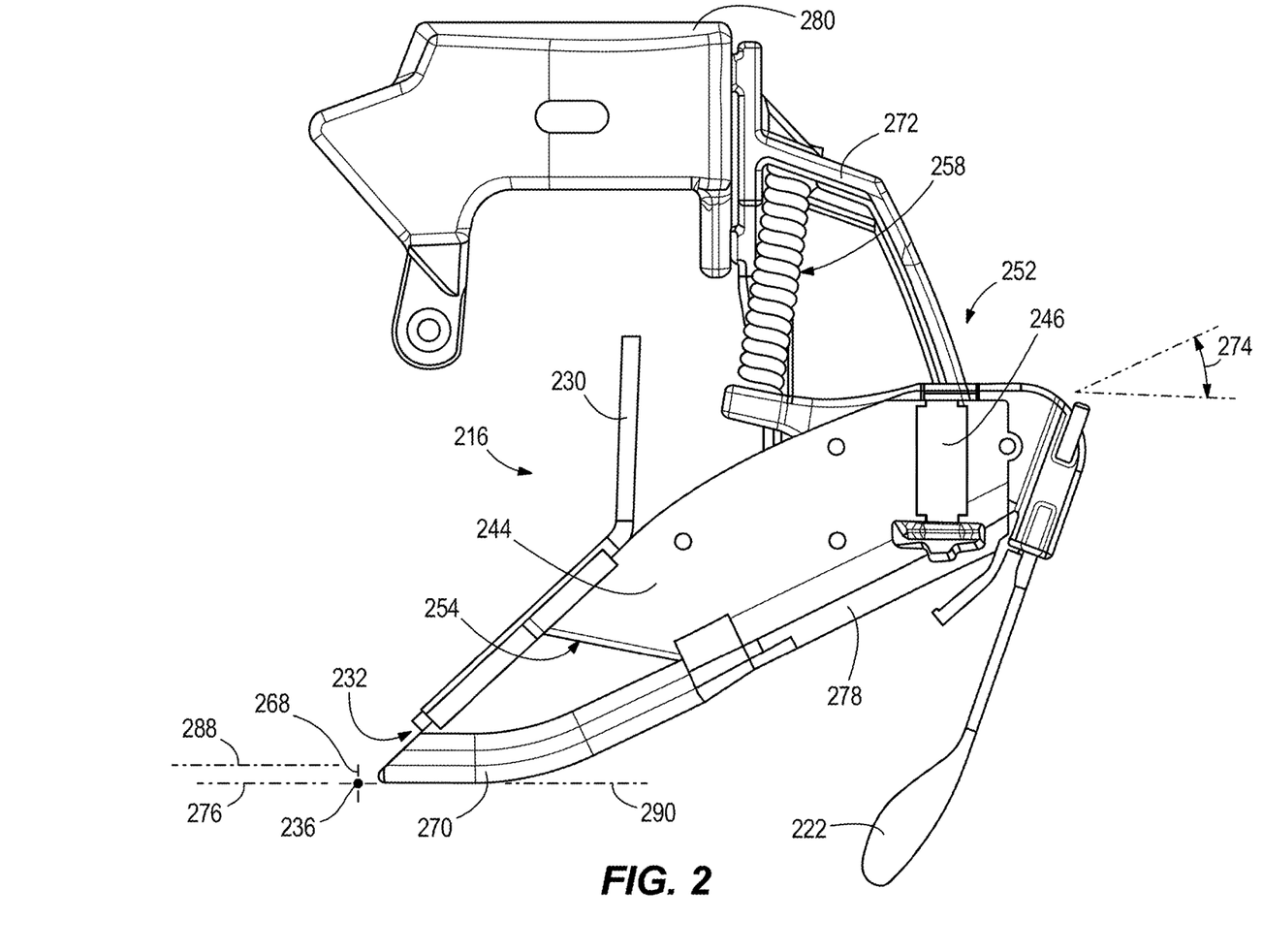
FIG. 2 illustrates a side view of one embodiment of a starter fertilizer attachment.

The fertilizer is expelled from the orifice 132. This is the fertilizer exit position. In some embodiments, the starter fertilizer system 104 is configured to align the fertilizer exit position from the orifice 132 with the desired fertilizer location. This alignment is controlled by the rudder blade 244 as shown in FIG. 2. The conduit 230 and orifice 232 in FIG. 2 may be secured to the top of rudder blade 244. The conduit 230 may be exposed to the soil passing by the rudder blade 244 and conduit 230. The conduit 230 may covered by a hard surface laser clad material to minimize the wearing of conduit 230. The process of surface hard coating the conduit may also include the welding of the conduit 230 to the rudder blade 244. Other means to secure the conduit 230 the rudder blade 244 may be to use a u-shaped cover, wire, or other means. For example, wire may be wrapped around the rudder blade 244 and conduit 230.

As shown in FIG. 2, the starter fertilizer attachment 216 may have a mounting bracket 280, base plate 272, rudder blade 244, rock joint 252, trailing joint 246, bend line angle 254, sharp bend angle 556 (FIG. 5), and spring 258. The rudder blade 244 may be positioned horizontally three-fourths inch to the right or left of the seed furrow centerline. The fertilizer centerline may be three-fourths inch horizontally to the right or left of the seed centerline. The seed centerline is also the seed furrow centerline. The rudder blade 244 may create a fertilizer furrow that has a furrow depth line 290 that is one-fourth inch below a seed depth furrow 288.

The rudder angle 274 may be the angle created from the tip of the rudder blade 244 to the rock joint 252 pivot pin versus the soil surface or from the centerline of the rudder blade 244 to the soil surface. The rudder angle 274 may be a twenty-five degree angle to the soil surface. The twenty-five degree angle may allow the rudder blade 244 to penetrate the soil surface smoothly. The rudder angle bend 274 may be as small as a ten degree angle and as large as a thirty-five degree angle. The soil may flow easily on both sides of the rudder blade 244. The rudder angle 274 may keep the rudder blade 244 at the correct depth for the shot 236 to be deposited in the desired fertilizer location.

The flat bottom line 276 of the rudder blade 244 may provide a longer wear surface than a point or shorter bottom line 276. The rudder blade 244 may be designed with a point. A point at the end of the rudder blade 244 may allow the rudder blade 244 to move horizontally. The longer flat bottom line 276 on the rudder blade 244 may have a longer life than a very short bottom or a point. The long flat bottom line 276 may increase the life of the rudder blade 244 and create forces to maintain the rudder blade 244 to be on the fertilizer centerline and in the desired fertilizer location.

Figure 3:
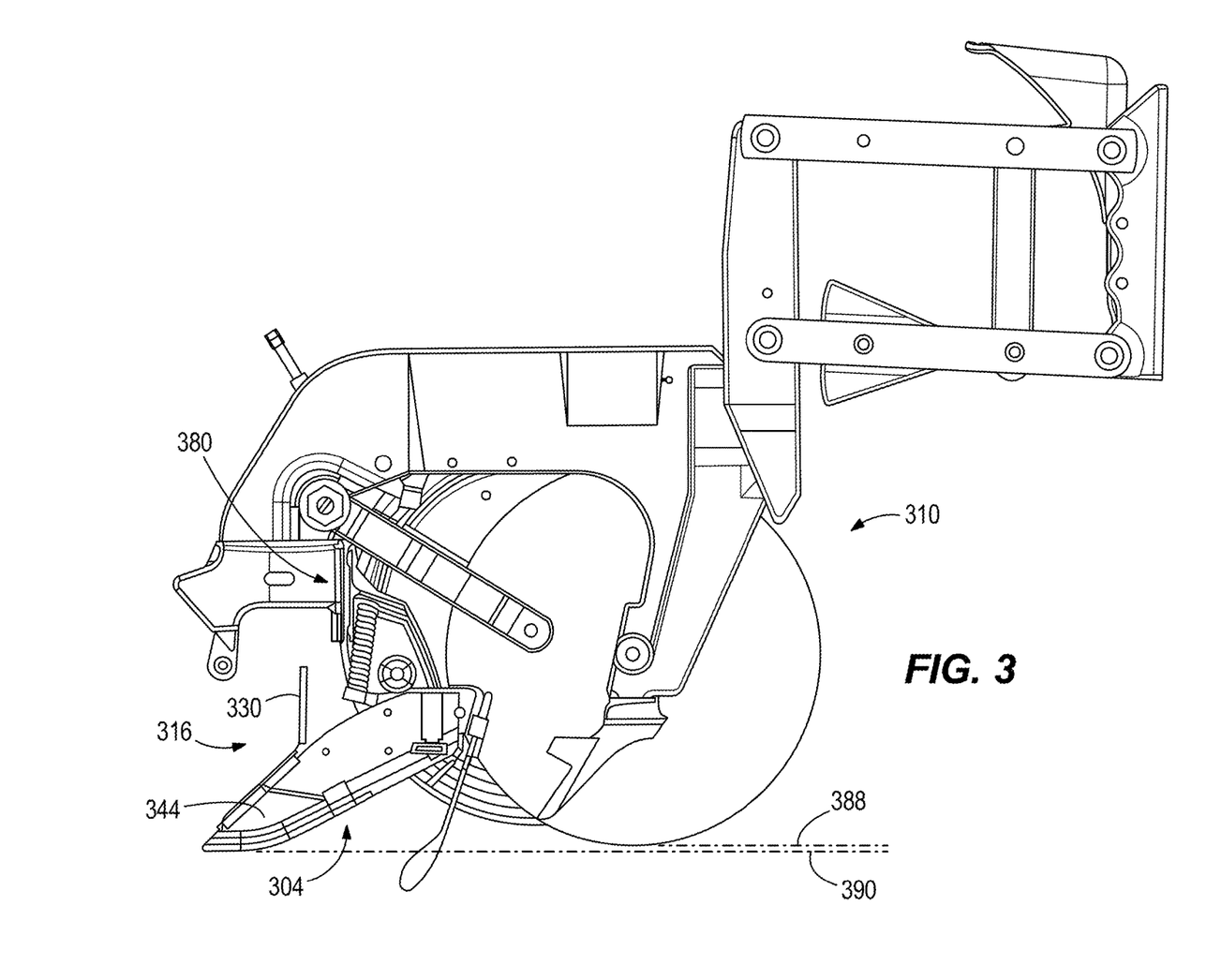
FIG. 3 illustrates a side view of one embodiment of an individual row unit with a starter fertilizer attachment.

As shown in FIG. 3, a mounting bracket 380 may connect the starter fertilizer system 316 to one or more individual row units 310. A mounting bracket 380 may be coupled to the individual row unit 310 by bolting, welding or integrally manufactured. The mounting bracket 380 may align the fertilizer attachment 316 to the individual row unit 310 to insure that the fertilizer shot is deposited ¾" right or left and ¼" below the seed location. For example, the mounting bracket 380 may be configured to align the rudder blade 344 and conduit 330 to the prescribed offset position of the seed. By way of example, the mounting bracket 380 may position the rudder blade 344 of the fertilizer attachment 316 to a position relative to the row unit 310 of planter 102, such that the fertilizer center line is located three-fourths of an inch adjacent to the seed center line. Likewise, the mounting bracket 380 may position the rudder blade 344 of the fertilizer attachment 316 to a position relative to the row unit 310 of planter 304, such that the fertilizer depth line 390 is located one-fourths inch below the seed depth line 388.

The mounting bracket 380 may be moveable. As such, the mounting bracket 380 may be moveable such that the row unit 110 of the planter 102 is moveable and the rudder blade 344 of the fertilizer attachment 316 is also moveable. This further allows the rudder blade 344 to be positioned relative to the planted seed or seed centerline.

Figure 4:
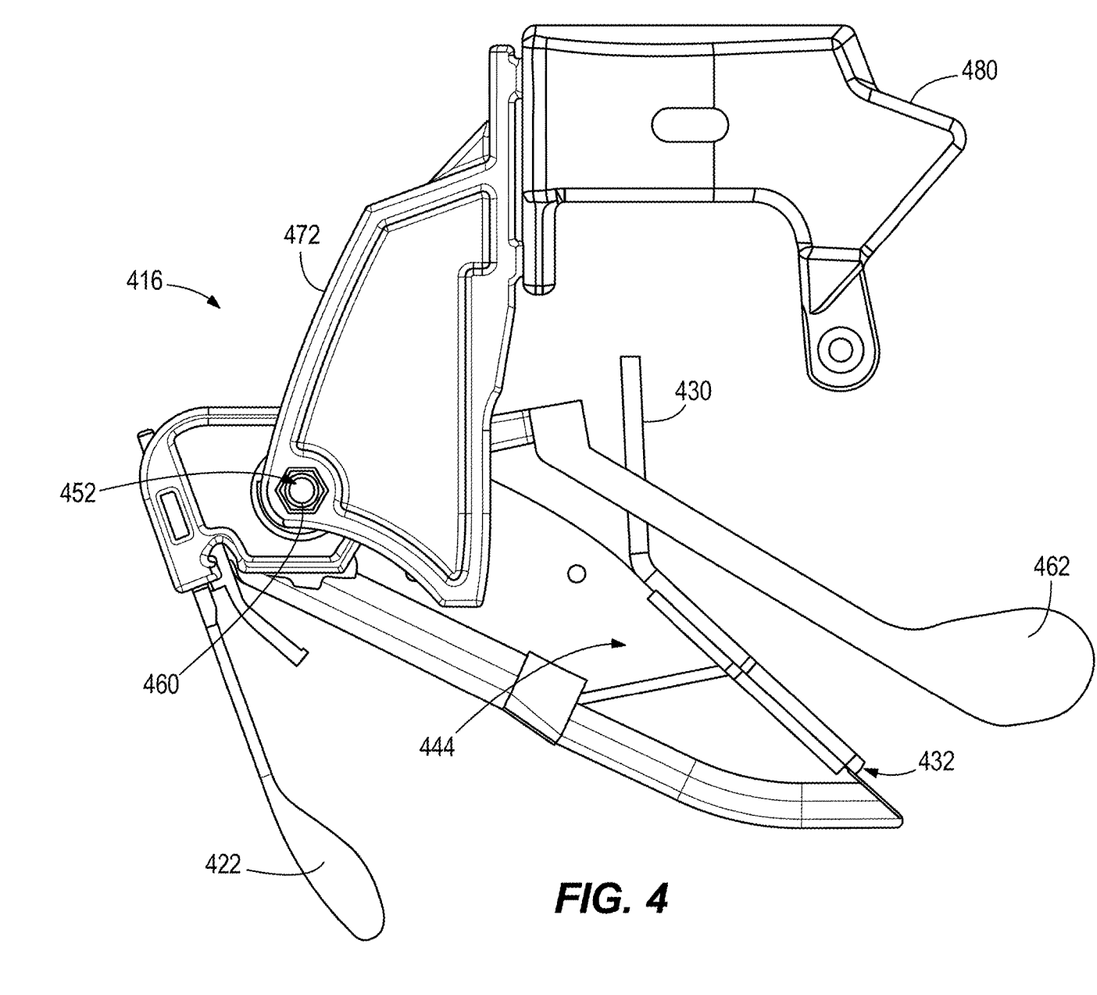
FIG. 4 illustrates a side view of one embodiment of a starter fertilizer attachment.

FIG. 4 illustrates a side view of the fertilizer attachment showing a pre-closing presser 462, mounting bracket 480, conduit 430, orifice 432, base plate 472, rock joint 452, rock joint pin 460, and seed firmer 422. The pre-closing presser 462 may be adapted to the fertilizer attachment 416 at the rearward end of the apparatus. The pre-closing presser 462 may be a metal or plastic paddle shape with a flat bottom. The function of the pre-closing presser 462 may be to press air from the soil. The rudder blade 444 may move the soil up or right or left. The disturbance of the soil by the rudder blade 444 may allow air pockets to form in the soil. The pre-closing presser 462 may collapse the air pockets that may be created by disturbance from rudder blade 444 passing through the soil. The soil may have a firmer texture as the pre-closing presser 462 passes over the soil.

Figure 5:
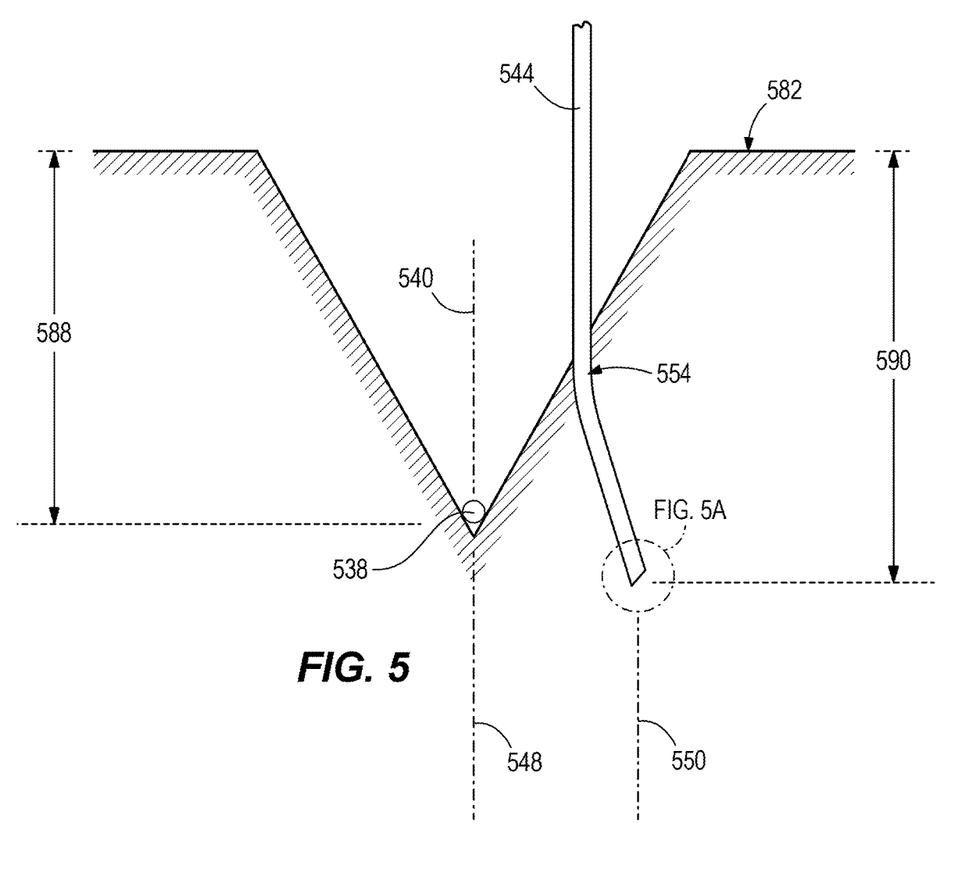
FIG. 5 illustrates a rear view of one embodiment of a seed furrow and a fertilizer furrow.
Figure 5A:
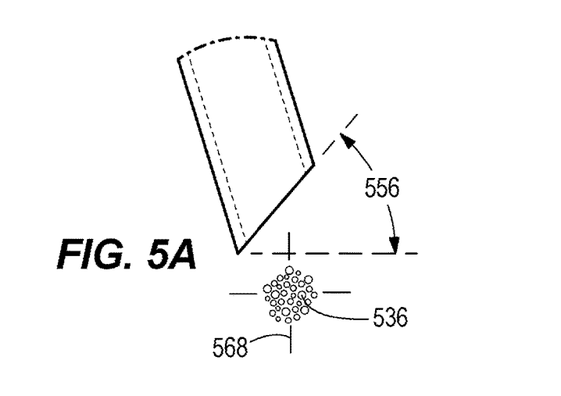

FIG. 5 illustrates a rear view of a seed furrow and a fertilizer furrow. In an embodiment, as shown in FIG. 5, the desired fertilizer location 568 is three-fourths horizontally to the seed 538 and one-fourth inch deeper than the seed 538. The starter fertilizer system may be configured to place each shot 536 into the desired fertilizer location 568. In order to place the shot into the location 568, the center line of the rudder blade 544 may be offset to the seed centerline 548. The rudder blade 544 centerline is the same as the fertilizer centerline 550. The relative placement of the shot 536 is at the desired fertilizer location 568. The desired fertilizer location 568 is at depth 590 from the soil surface 582. The depth 590 may be one-fourth inch deeper or larger than the seed depth 588 relative to the soil surface 582. The fertilizer centerline 550 is positioned horizontally three-fourths inch to the right of the seed center line 548 which is the seed furrow 540.

The bend line angle 554 of the rudder blade 544 is shown. The slant sharp angle 556 may be at the bottom of the rudder blade 544. The slant sharp angle 556 may be a single sided shape on the bottom of the rudder blade 544. The single sided shape of the slant sharp angle 556 may stabilize horizontal deflection from the impact of a hard object as the planter 104 (FIG. 1) and rudder blade 544 move forward through the soil. As the rudder blade 544 moves through the soil, the slant sharp angle 556 shape may give the rudder blade 544 a stabilizing effect to stay on the fertilizer center line 550. The slant sharp angle 556 may tend the rudder blade 544 to follow the trailing joint which is offset to the seed center line three-fourths inch horizontally to the seed centerline 548. The slant sharp angle 556 is shown as a singled sided angle with the point on the left side. The slant sharp angle 556 may be any shape configuration on the bottom of the rudder blade 544. The point of the slant sharp angle 556 may completely be on left side as shown, right side, in the center or any point on the face of the rudder blade 544. The sharp slant angle is shown as forty-five degrees. The sharp slant angle may be any angle for zero degree to ninety degrees.

As shown in FIG. 2 the fertilizer attachment 216 components are the rudder blade 244, trailing joint 246, rock joint 252, conduit 230, orifice 232, and differential hardness area 270. The trailing joint 246, rock joint 252, bend line angle 254, sharp bend angle 556 (FIG. 5) and position locator may keep or force the rudder blade 244 to the fertilizer centerline. Maintaining the rudder blade 244 on fertilizer centerline is the focus of the following discussion.

As shown in FIG. 2, the front dust bend 278 may be a bend in the front of the rudder blade 244. The front dust bend 278 may be a forty-five angle to a vertical line of the rudder blade 244. The front dust bend 278 may alleviate non soil components passing by the rudder blade 244. Any crop residue may attach to rudder blade 244 causing extra force on the rudder blade 244. Any additional force may move the rudder blade 244 off the fertilizer centerline. The front dust bend 278 may keep residue from touching or remove residue from the rudder blade 244 thus minimizing the effect of residue on the rudder blade 244 position.

Maintaining a clean environment around rudder blade 44 may keep the shot 236 from being deposited on residue or some other foreign material. The fertilizer shot 36 deposited on residue or other than in the desired fertilizer location may make the fertilizer ineffective.

As shown in FIG. 2 the seed firmer 222 may be removed from a row unit 110 (FIG. 1) and positioned on the fertilizer attachment 216. The seed firmer 222 may be positioned to be located on the seed centerline. The seed firmer 222 may be repositioned to allow the starter fertilizer system 216 to be installed on the row unit 110 (FIG. 1). The function of the seed firmer 222 does not change and its function is to press the seed firmly into the soil.

Figure 6:
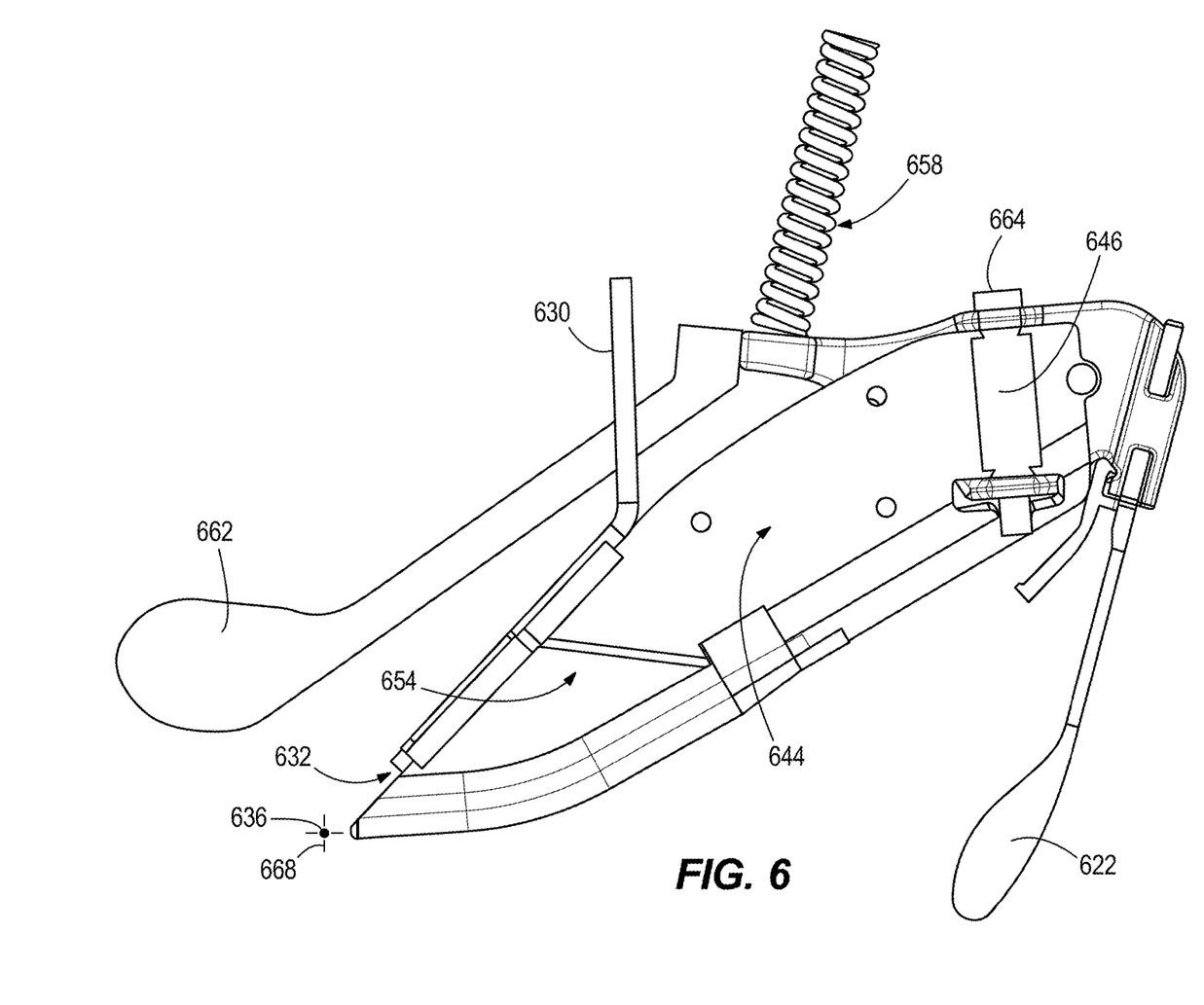
FIG. 6 illustrates a side view of one embodiment of a trailing joint and a rudder blade.

As shown in FIG. 6, the trailing joint 646 has a vertical pivot pin 664 that may be in line with the desired fertilizer location and fertilizer centerline. The fertilizer centerline may be in line at the center of the trailing joint 646. The rudder blade 644 may be attached to the trailing joint 646 directly. The attachment of the rudder blade 644 to the trailing joint 646 may keep the rudder blade 644 following the trailing joint 646. Unless external forces from the soil or rocks may be present, the rudder blade 644 may follow trailing joint 646 inline.

Pulling the planter through the field with the rudder blade 644 in the soil may encounter a hard object, such as a rock that impacts the rudder blade 644. Upon impact the rudder blade 644 may move to the right or left turning at the trailing joint 646. Any movement of the rudder blade 644 off of the fertilizer centerline caused by the impact of an object may cause the shot to be deposited outside the desired fertilizer location 668. Any shot 636 not deposited in the desired fertilizer location 668 may decrease crop yield. The alignment of the rudder blade 644 to the trailing joint 646 is necessary to obtain the full effectiveness of the fertilizer shot 636. Also shown are the seed firmer 622, rudder blade 644, conduit 630, spring 658, pre-closing presser 662, and orifice 632.

Figure 7:
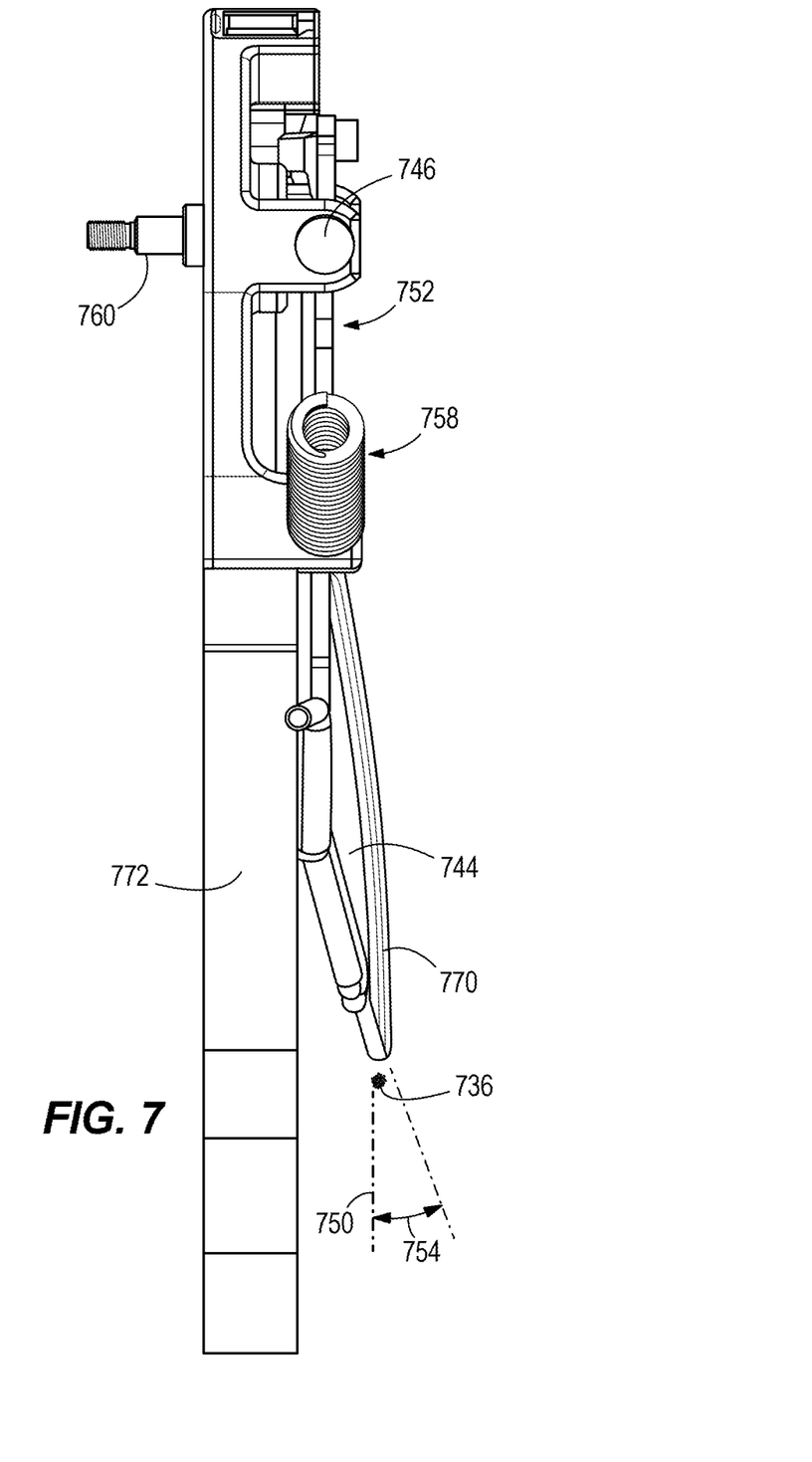
FIG. 7 illustrates a top view of one embodiment of a rock joint.

As shown in FIG. 7, the rock joint 752 may have a bushing in the rudder blade 744. A rock joint pin 760 (shoulder bolt) is threaded through the bushing into the base plate 772 of the assembly. The rock joint pin 760 may allow the rudder blade 744 to rotate around the rock joint pin 760. The rotation may allow the rudder blade 744 to move vertically. A rock or other hard surface may impact the rudder blade 744. The impact force may cause the rudder blade 744 to move upward. A spring 758 is preloaded as shown in FIG. 2. The preload force of the spring 758 may keep the rudder blade 744 at the prescribed level. As the impact force exceeds the spring 758 preload, the rudder blade 744 may move upward. The preloaded spring 758 may force the rudder blade 758 back the prescribed position as the impact force dissipates. A spring 758 may be preloaded by a bolt. The function of the spring 758 preloaded rock joint 752 may be to limit or eliminate physical damage to the rudder blade 744 during an impact with a hard surface. Another function of the spring 748 preload may be to maintain the depth level of one-fourth inch below the seed planted and firmed depth. The rock joint 752 is also shown in FIG. 2.

In another embodiment, as shown in FIG. 7, the rock joint 752, a pre-loaded spring of the first embodiment may be replaced by a sensor and a pneumatic, hydraulic or electric actuator to replace the spring 758. A sensor of moisture, position, force or torque may be used to control the vertical position of the rudder blade 744. A pneumatic, hydraulic or electric actuator may be used with the sensor and an algorithm to reduce the impact forces on the rudder blade 744. The pneumatic, hydraulic or electric actuator may be connected to the rudder blade 744 and the base plate 772. The sensor may keep the rudder blade 744 positioned at the prescribed depth level. The function may change from a reactionary movement to a proactive movement.

The sensor embodiment also may signal the position of the rudder blade 744 and also allow the depth to be monitored or to easily adjust depth vertically.

As shown in FIG. 7 the rudder blade 744 may have the bend line angle 754 to the right side. The right side shows layers of hardened material 770 such as tungsten carbide. The opposite side (left side) of the rudder blade 744 may also have hardened material also. The right may be elevated hardness to cause a differential between the right and left side. The hardness differential may yield a smaller wear pattern on the right side.

EMBODIMENTS FOR REALIGNMENT

As shown in FIG. 5, positioning the shot 536 in the desired fertilizer location 568 may be initially obtained by aligning the trailing joint 246 (FIG. 2) three-fourths inch to the seed furrow centerline 548. Since the environment in the soil may have rocks and other objects, the rudder blade 544 will be forced horizontally to the right or left. The rapid return of the rudder blade 544 to the fertilizer centerline 550 may rapidly move the shot 536 back in the desired fertilizer zone 568. Therefore, each of the three embodiments described may illustrate designs or systems to keep the alignment or return the rudder blade 544 to rapidly realign of the rudder blade 544 to the fertilizer centerline 550.

Embodiment #1: Bend Line Angle

In an embodiment, as shown in FIGS. 2 the bend line angle 254 may be a bend in the rudder blade 244 of approximately ten degrees. Although the bend line angle 254 on the rudder blade 244 may have a small horizontal force component, the rudder blade 244 may still follow the trailing joint 246 on the fertilizer centerline during the normal operation. Normal operation may be defined as only soil touching the rudder blade 244 on both sides. The abnormal operation may be a rock or another object impacting the rudder blade 244. The impact of a rock on the rudder blade 244 may move horizontally off the fertilizer centerline. Any time the rudder blade 244 is not on fertilizer centerline, it may have an adverse effect on any shots 236 being deposited outside of the desired fertilizer location 268.

From the rear view of FIG. 7 the bend line angle 754 may be bent upward and to the right by ten degrees on the rudder blade 744. The bend line angle 754 may have a force to move the rudder blade 744 back to the fertilizer centerline 750 directly behind the trailing joint 746.

The bend line angle 754 has been described as a bend in the rudder blade 744. The bend line angle 754 may be other configurations; such as, a curved surface, a double bend surface or any surface to generate a force that may keep or move the rudder blade 744 back to fertilizer centerline 750.

Embodiment #2: Sensor and Pneumatic, Hydraulic or Electric Actuation

Another embodiment to align and maintain alignment of the rudder blade 744 on the fertilizer centerline 750 may be to sense the rudder blade 744 position. A pneumatic, hydraulic or electric actuation may be connected to the rudder blade 744. The rudder blade 744 moves to the right or left from an impact of an object. The sensor may signal a controller to increase the force on the appropriate side to move the rudder blade 744 back to the fertilizer centerline 750. The sensor may continually sense rudder blade 744 position. With the continually correcting actuator the rudder blade 744 may be positioned properly on the fertilizer centerline 750 and the shot 736 being deposited in the desired fertilizer location.

Embodiment #3: Double Preloaded Springs

As shown in FIG. 5, double preloaded springs may be used to align and maintain alignment of the rudder blade 534 on the fertilizer centerline 550. Each of the two springs may be preloaded in the opposite direction. During the normal operation both springs may be acting against the rudder blade in opposite directions to keep it on the fertilizer centerline 550 A rock impacting the rudder blade 544 may cause a force on the rudder blade 544. An impact force greater than the preload spring force may cause the rudder blade 544 to move to the right or left. As soon as the rock has passed and the impact force no longer exists on the rudder blade 544, the deflected spring force may then move the rudder blade 544 back to the fertilizer centerline 550.

Figure 8:
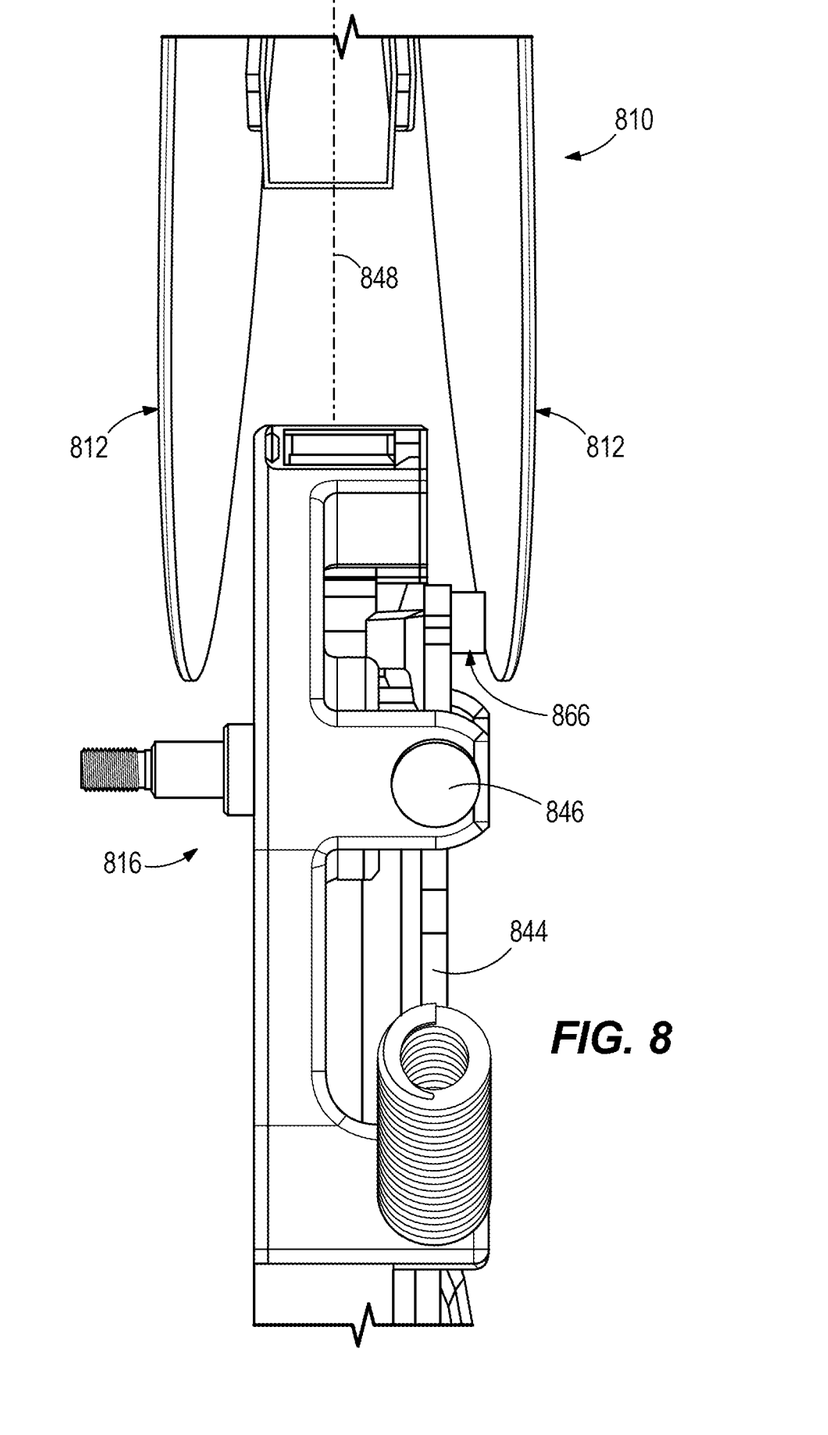
FIG. 8 illustrates a top view of one embodiment of a locator pin or spacer that positions a starter fertilizer attachment.

As shown in FIG. 8, a locator or positioning pin/spacer 866 may be used to install the fertilizer attachment 816 on the row unit 810. The positioning pin 866 may be a plastic tube or washer that is sized to provide the proper offset. The positioning pin/spacer 866 is used to align the trailing joint 846 and rudder blade 844 to the desired three-fourths inch horizontal distance to the seed centerline 848. Viewed from the rear view of FIG. 8, the right side seed furrow disk 812 may be used as the position point as the base row unit 810 indicator point. The positioning pin/spacer 866 may be used to space the rudder blade 844 to the correct horizontal distance from the right furrow disk 812. The spacer positions the rudder blade 844 three-fourths inch to the right of the seed centerline 848.

Figure 9:
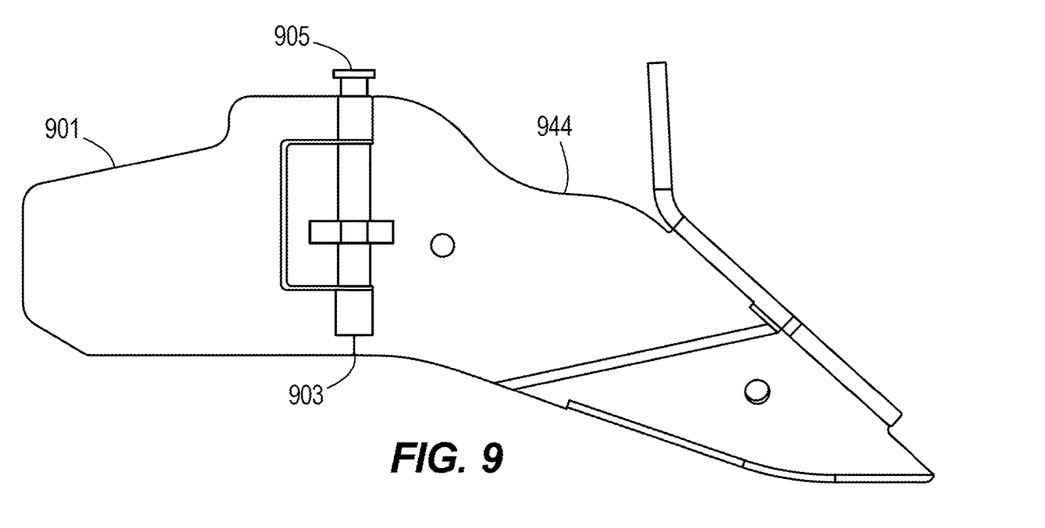
FIG. 9 illustrates a side view of one embodiment of a material guide attached to a rudder blade.

As shown in FIG. 9, in one embodiment a material guide 901 is attached to a rudder blade 944. The rudder blade 944 may have any of the features described for other rudder blade embodiments disclosed herein. In other embodiments, the rudder blade 944 may further vary. The material guide 901 may provide a guiding surface that extends inside a row unit (previously described) near the opening discs (previously described). As material, such as crop residue, is carried under and around the opening discs on a planter row unit, it is intercepted by a lower edge of the material guide 901. The forward motion of a planter causes the material to slide along the lower edge of the material guide 901 until it is handed off to the rudder blade 944 and continues sliding along the lower edge until it is ejected off the rear. Without the material guide 901, there are points where the material could wrap around the leading edge of the rudder blade 944 and build-up. The gap 903 between the material guide 901 and the rudder blade 944 is minimized and made smooth so that the material is cleanly handed off to the rudder blade 944. The material guide 901 is rotatably mounted on a blade mount pin 905 so that it can move when contacted by the opening discs or other objects. The material guide 901 may be mounted on a separate rotation point or it may be fixed and positioned to rarely contact the opening discs. The material guide 901 may be used with any rudder blade design.

Figure 10:
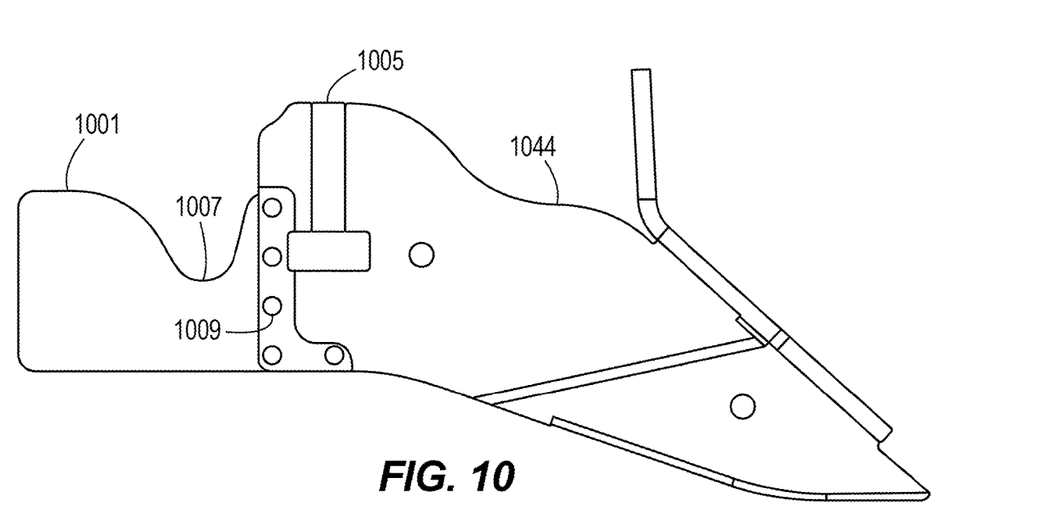
FIG. 10 illustrates a side view of another embodiment of a material guide attached to a rudder blade.

As shown in FIG. 10, in another embodiment a material guide 1,001 is attached to a rudder blade 1,044 in a different manner. The rudder blade 1,044 may have any of the features described for other rudder blade embodiments disclosed herein. In other embodiments, the rudder blade 1,044 may further vary. The material guide 1,001 may be made of a flexible material, such as a wear resistant plastic or spring steel, and may be rigidly mounted to the rudder blade 1,044. The material guide 1,001 may be designed with a flexing zone 1,007 that provides a weaker location where the material guide 1,001 can flex when contacting the opening discs or other objects. Rivets 1,009 may be used to mount the material guide 1,001 to the rudder blade 1,044 but other mounting methods may be used. The rudder blade 1,044 may be fixedly mounted on a blade mount pin 1,005. In other embodiments, the rudder blade 1,044 may be rotatably mounted on the blade mount pin 1,005. The material guide 1,101 may be used with any rudder blade design.

Figure 11:
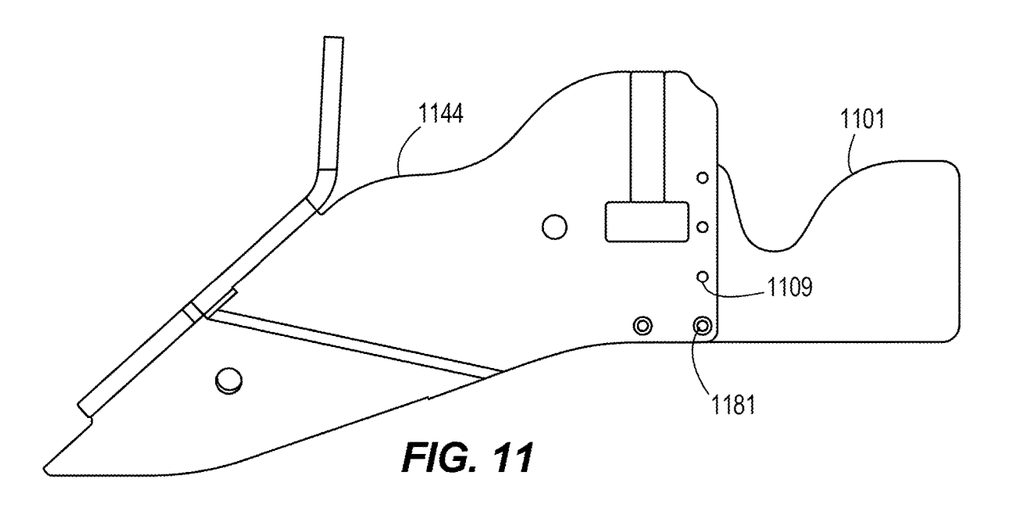
FIG. 11 illustrates a side view of yet another embodiment of a material guide attached to a rudder blade.

As shown in FIG. 11, in another embodiment a material guide 1,101 is attached to a rudder blade 1,144 in a different manner. The rudder blade 1,144 may have any of the features described for other rudder blade embodiments disclosed herein. In other embodiments, the rudder blade 1,144 may further vary. Counter sunk mounting points 1,111 may be used to shield rivets 1,109 or other mounting features from the soil and material sliding along the rudder blade 1,144 and material guide 1,101. The material guide 1,101 may be used with any rudder blade design.

Figure 12:
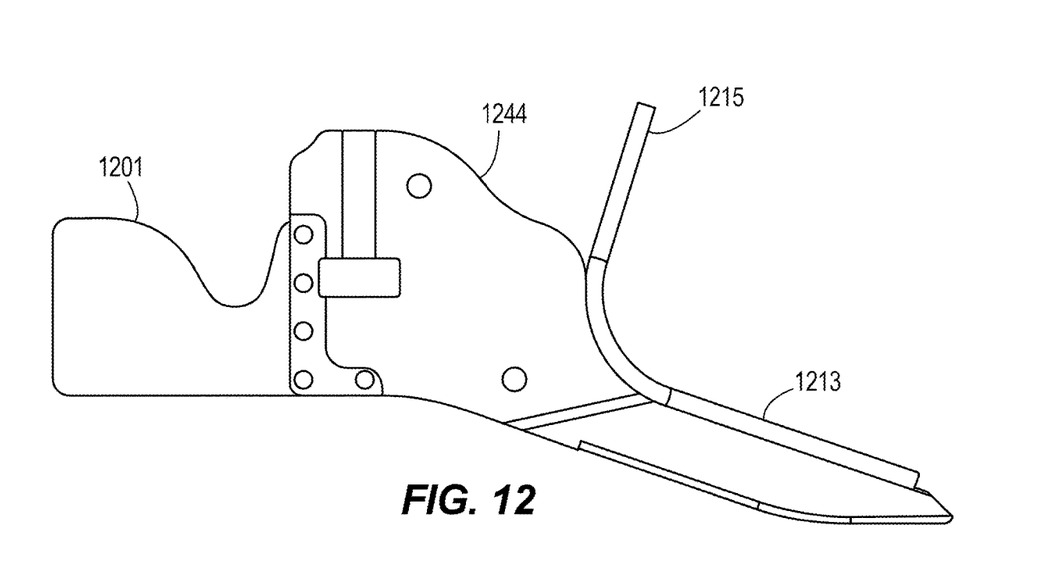
FIG. 12 illustrates a side view of still another embodiment of a material guide attached to a rudder blade.

As shown in FIG. 12, in another embodiment a material guide 1,201 is attached to a rudder blade 1,244 in a different manner. The rudder blade 1,244 may have any of the features described for other rudder blade embodiments disclosed herein. In other embodiments, the rudder blade 1,244 may further vary. The shape of the rudder blade 1,244 may be designed to reduce the surface area where soil can stick and build up. The height of the rudder blade 1,244 may be lowered near a working end 1,213 so that the remaining surface area of the rudder blade 1,244 is in firm contact with soil and scour cleaned by the frictional forces as it is pulled through the field. A liquid conduit 1,215 is shaped to follow a top profile of the rudder blade 1,244 and apply liquid near the end. The material guide 1,201 may be used with any rudder blade design.

The planting process may include creating a seed furrow, placing a seed in the seed furrow, covering the seed with soil, creating a fertilizer furrow, and placing fertilizer in the furrow. The systems and apparatuses described above may be used to perform the planting process. As such, the result of these systems and apparatuses described above may be one or more methods for planting seed and distributing starter fertilizer. Additional, different, or fewer steps may be used in the planting process.

The foregoing description is presented to enable one of ordinary skill in the art to make and use the invention and is provided in the context of a patent application and its requirements. Various modifications to the preferred embodiment of the apparatus, and the general principles and features of the system and methods described herein will be readily apparent to those of skill in the art. Thus, the present invention is not to be limited to the embodiments of the apparatus, system and methods described above and illustrated in the drawing figures, but are to be accorded the widest scope consistent with that of the appended claims.

The invention claimed is:

1. A starter fertilizer system for an agricultural implement having multiple row units with each row unit comprising opening discs for opening a trench in soil for a planted seed and gauge wheels for setting a depth of the trench, the starter fertilizer system configured to apply fertilizer for the planted seed during a planting process, the starter fertilizer system comprising:
a rudder blade, wherein the rudder blade is configured to dig a furrow offset from the planted seed in the trench;
a conduit configured to expel the fertilizer into the furrow, the conduit coupled with the rudder blade;
wherein the rudder blade is configured to be offset from each row unit to expel the fertilizer in the furrow at a desired fertilizer location relative to the planted seed; and
one or more of the following: (1) the starter fertilizer system further comprising a trailing joint that is configured to horizontally re-align the rudder blade, with the rudder blade horizontally rotating around the trailing joint, in the event the rudder blade is deflected by an object off a fertilizer centerline, the rudder blade bent at a bend line angle which is configured to provide a force on the rudder blade to horizontally move the rudder blade horizontally back to the fertilizer centerline directly behind the trailing joint after the rudder blade is deflected by the object; (2) the starter fertilizer system further comprising the trailing joint, a sensor, a controller, and an actuator, the trailing joint configured to horizontally re-align the rudder blade, with the rudder blade horizontally rotating around the trailing joint, in the event the rudder blade is deflected by the object off the fertilizer centerline, the controller configured to, based on the sensor sensing that the rudder blade has been deflected off the fertilizer centerline, use the actuator to move the rudder blade back to the fertilizer centerline; (3) the starter fertilizer system further comprising a material guide connected with the rudder blade, the material guide configured to extend inside the row unit near the opening discs, the material guide rotatably mounted on a blade mount pin relative to the rudder blade; (4) the starter fertilizer system further comprising the material guide connected with the rudder blade, the material guide configured to extend inside the row unit near the opening discs, wherein the material guide is made of a flexing material comprising a flexing zone that provides a weaker location of the material guide where the material guide is designed to flex; and (5) the starter fertilizer system further comprising the material guide connected with the rudder blade, the material guide configured to extend inside the row unit near the opening discs, wherein the material guide is fixedly mounted to the rudder blade with rivets with countersunk mounting points shielding the rivets.

2. The starter fertilizer system of claim 1, wherein the desired fertilizer location is configured to be a prescribed distance horizontally and prescribed distance vertically offset from the planted seed.

3. The starter fertilizer system of claim 1 further comprising a rock joint that is configured to vertically re-align the rudder blade, with the rudder blade vertically rotating around the rock joint, in the event the rudder blade is deflected by the object.

4. The starter fertilizer system of claim 3 further comprising a spring biasing the rudder blade towards a prescribed position, wherein in the event the rudder blade is deflected by the object with sufficient force the rudder blade is configured to overcome the bias of the spring and vertically rotate around the rock joint.

5. The starter fertilizer system of claim 3 further comprising the sensor, thecontroller, and the actuator, the controller configured to, based on sensor measurements regarding moisture, position, force, or torque, control vertical movement of the rudder blade using the actuator.

6. The starter fertilizer system of claim 1 further comprising (1) the trailing joint that is configured to horizontally re-align the rudder blade, with the rudder blade horizontally rotating around the trailing joint, in the event the rudder blade is deflected by the object off the fertilizer centerline, the rudder blade bent at the bend line angle which is configured to provide the force on the rudder blade to horizontally move the rudder blade horizontally back to the fertilizer centerline directly behind the trailing joint after the rudder blade is deflected by the object.

7. The starter fertilizer system of claim 1 further comprising (2) the trailing joint, the sensor, the controller, and the actuator, the trailing joint configured to horizontally re-align the rudder blade, with the rudder blade horizontally rotating around the trailing joint, in the event the rudder blade is deflected by the object off the fertilizer centerline, the controller configured to, based on the sensor sensing that the rudder blade has been deflected off the fertilizer centerline, use the actuator to move the rudder blade back to the fertilizer centerline.

8. The starter fertilizer system of claim 1 further comprising double preloaded springs preloaded against the rudder blade in opposite directions, the double preloaded springs configured to move the rudder blade back to the fertilizer centerline when the rudder blade is deflected by the object off the fertilizer centerline.

9. The starter fertilizer system of claim 1 (3) further comprising the material guide connected with the rudder blade, the material guide configured to extend inside the row unit near the opening discs, the material guide rotatably mounted on the blade mount pin relative to the rudder blade.

10. The starter fertilizer system of claim 1, wherein the material guide is fixedly mounted to the rudder blade.

11. The starter fertilizer system of claim 1 further comprising (4) the material guide connected with the rudder blade, the material guide configured to extend inside the row unit near the opening discs, wherein the material guide is made of the flexing material comprising the flexing zone that provides the weaker location of the material guide where the material guide is designed to flex.

12. The starter fertilizer system of claim 1 further comprising (5) the material guide connected with the rudder blade, the material guide configured to extend inside the row unit near the opening discs, wherein the material guide is fixedly mounted to the rudder blade with rivets with countersunk mounting points shielding the rivets.

13. The starter fertilizer system of claim 1, wherein a height of the rudder blade is lower at a working end of the rudder blade than at other portions of the rudder blade.

14. The starter fertilizer system of claim 13, wherein the conduit is configured to apply the fertilizer at the working end of the rudder blade.

15. The starter fertilizer system of claim 1 further comprising a pre-closing presser configured to press air from the soil.

16. The starter fertilizer system of claim 1 further comprising a seed firmer configured to press the planted seed into the soil.

17. A method of applying fertilizer at a desired fertilizer location relative to a planted seed comprising:
 opening a trench using opening discs;
 depositing the planted seed in the trench;
 digging a furrow, offset at the desired fertilizer location from the planted seed, using a rudder blade;
 expelling the fertilizer through a conduit attached to the rudder blade into the furrow offset at the desired fertilizer location from the planted seed; and
 at least one of: (1) the rudder blade being deflected by an object off a fertilizer centerline and, subsequently, a trailing joint horizontally re-aligning the rudder blade by rotating around the trailing joint, the rudder blade horizontally moving back to the fertilizer centerline directly behind the trailing joint due to the rudder blade being bent at a bend line angle; (2) the rudder blade being deflected by the object off the fertilizer centerline and, subsequently, a sensor sensing that the rudder blade has been deflected and a controller thereafter using an actuator to move the rudder blade back to the fertilizer centerline, the trailing joint horizontally re-aligning the rudder blade by rotating around the trailing joint; (3) a material guide, connected with the rudder blade and extending near the opening discs, rotating on a blade mount pin relative to the rudder blade, and guiding material from the opening discs to the rudder blade preventing build-up of the material on the ruder blade; and (4) the material guide, connected with the rudder blade and extending near the opening discs, flexing at a flexing zone, and guiding the material from the opening discs to the rudder blade preventing build-up of the material.

18. The method of claim 17 wherein the desired fertilizer location is a prescribed distance horizontally and prescribed distance vertically offset from the planted seed.

19. The method of claim 17 further comprising the rudder blade being deflected by the object and a rock joint vertically re-aligning the rudder blade with the rudder blade vertically rotating around the rock joint.

20. The method of claim 19 further comprising when the rudder blade is deflected by the object with sufficient force the rudder blade overcoming a bias of the spring and vertically rotating around the rock joint.

21. The method of claim 19 further comprising vertical movement of the rudder blade being controlled by the controller controlling the actuator connected to the rudder blade based on sensor measurements regarding moisture, position, force, or torque.

22. The method of claim 17 further comprising (1) the rudder blade being deflected by the object off the fertilizer centerline and, subsequently, the trailing joint horizontally re-aligning the rudder blade by rotating around the trailing joint, the rudder blade horizontally moving back to the fertilizer centerline directly behind the trailing joint due to the rudder blade being bent at a bend line angle.

23. The method of claim 17 further comprising (2) the rudder blade being deflected by the object off the fertilizer centerline and, subsequently, the sensor sensing that the rudder blade has been deflected and the controller thereafter using the actuator to move the rudder blade back to the fertilizer centerline, the trailing joint horizontally re-aligning the rudder blade by rotating around the trailing joint.

24. The method of claim 17 further comprising, after the rudder blade is deflected by the object off the fertilizer centerline, double preloaded springs, preloaded in opposite directions, moving the rudder blade back to the fertilizer centerline.

25. The method of claim 17 further comprising the material guide being fixedly attached to the rudder blade.

26. The method of claim 17 further comprising (3) the material guide, connected with the rudder blade and extending near the opening discs, rotating on the blade mount pin relative to the rudder blade, and guiding the material from the opening discs to the rudder blade preventing build-up of the material on the ruder blade.

27. The method of claim 17 further comprising (4) the material guide, connected with the rudder blade and extending near the opening discs, flexing at the flexing zone, and guiding the material from the opening discs to the rudder blade preventing build-up of the material.

* * * * *

UNITED STATES PATENT AND TRADEMARK OFFICE
CERTIFICATE OF CORRECTION

PATENT NO. : 12,426,530 B2
APPLICATION NO. : 17/865332
DATED : September 30, 2025
INVENTOR(S) : Sauder et al.

It is certified that error appears in the above-identified patent and that said Letters Patent is hereby corrected as shown below:

In the Claims

In Column 12, Claim 5, Line 11, delete "thecontroller," and insert -- the controller, --, therefor.

In Column 13, Claim 17, Line 33, delete "ruder" and insert -- rudder --, therefor.

In Column 14, Claim 26, Line 38, delete "ruder" and insert -- rudder --, therefor.

Signed and Sealed this
Eleventh Day of November, 2025

John A. Squires
*Director of the United States Patent and Trademark Office*